United States Patent
Powell

(10) Patent No.: US 11,095,839 B1
(45) Date of Patent: Aug. 17, 2021

(54) REDUCING SMEAR THROUGH DIGITAL CANCELLATION IN IMAGE SENSOR

(71) Applicant: SHENZHEN GOODIX TECHNOLOGY CO., LTD., Shenzhen (CN)

(72) Inventor: Matthew Powell, San Diego, CA (US)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 16/905,919

(22) Filed: Jun. 19, 2020

(51) Int. Cl.
*H04N 5/359* (2011.01)
*H04N 5/3745* (2011.01)
*H04N 5/378* (2011.01)

(52) U.S. Cl.
CPC ........... *H04N 5/3595* (2013.01); *H04N 5/378* (2013.01); *H04N 5/37455* (2013.01)

(58) Field of Classification Search
None
See application file for complete search history.

(56) References Cited

U.S. PATENT DOCUMENTS

2007/0165120 A1* 7/2007 Takane ................. H04N 5/2351
348/248

* cited by examiner

*Primary Examiner* — Mark T Monk
(74) *Attorney, Agent, or Firm* — Kilpatrick Townsend & Stockton LLP

(57) ABSTRACT

An apparatus of reading out an image sensor having a plurality of pixels arranged in rows and columns includes a plurality of analog-to-digital converters (ADCs) configured to output digital codes representative of received pixel signals of pixels coupled to respective ADCs, and a smear cancellation circuit configured to determine an average value of the digital codes, multiply the average value by a factor to obtain an offset value, and subtract the offset value from the digital codes to obtain smear-cancelled digital codes.

20 Claims, 7 Drawing Sheets

US 11,095,839 B1

REDUCING SMEAR THROUGH DIGITAL CANCELLATION IN IMAGE SENSOR

TECHNICAL FIELD

The present invention relates to image sensors, and more particularly, to an apparatus and method of eliminating smear when reading out pixel signals of pixels in an image sensor that is exposed to a bright light source.

BACKGROUND

In an image sensor with a large array of pixels, it is common to have a large number of ADCs, corresponding to the number of pixel columns, a small integer fraction of the number of columns, or small integer multiple of the number of columns. When an image frame is read out, each ADC sequentially reads out pixels in a column-based pattern and all the ADCs together are typically reading out a set of pixels in a row-based pattern simultaneously with each other. One common impairment of image sensors is that a bright object captured in a subset of pixels in the array can lead to distortion in other portions of the array. This is commonly known as smear. One common smear mechanism is overflow of full pixels to nearby pixels, leading to higher readout in those neighboring pixels. Another common mechanism is related to the simultaneous pixel read out by many ADCs operating at the same time. In a large array it is efficient and necessary for many control signals, references, supply connections, ground connections, etc. to be shared among large sets of pixels and ADCs or the entire array. Typically, there is coupling from the pixel read out chain to these signals and coupling back from the shared signals to the readout. Some of the portions of the pixel read out chain will carry a signal related to the pixel signal and will disturb the shared signals in a way proportional to the pixel signal.

Thus, when many pixels are read out simultaneously, a set of bright pixels with large signals present can disturb some of the shared signals and effect the read out of all the pixels read out in that moment, but especially dark pixels which have small signal and the effect of the disturbance is most noticeable. This effect is called smear and is an undesired property in an image sensor. It is generally necessary to take many steps to mitigate the coupling from pixel read out chain to shared signals and vice versa to limit smear to very low levels.

BRIEF SUMMARY OF THE INVENTION

The present invention discloses an integrated-circuit image sensor including a smear cancellation circuit that is configured to determine a cancellation factor based on digital codes of readout pixels and scale the digital codes to reduce or eliminate smear.

According to an aspect of the invention, an apparatus of reading out an image sensor having a plurality of pixels arranged in rows and columns is provided. The apparatus includes a plurality of analog-to-digital converters coupled to respective columns and configured to output digital codes representative of received pixel signals of pixels coupled to the respective columns, and a smear cancellation circuit configured to determine an average value of the digital codes, multiply the average value by a factor to obtain an offset value, and subtract the offset value from the digital codes to obtain smear-cancelled digital codes.

According to a second aspect of the invention, an image sensor includes the apparatus as described above.

According to a third aspect of the invention, a method of cancelling smears in an image sensor comprising a pixel array having a plurality of pixels arranged in rows and columns is provided. The method includes providing pixel signals of a set of pixels to a plurality of analog-to-digital converters, converting the pixel signals to digital codes representative of the pixel signals by the analog-to-digital converters, determining an average value of the digital codes by a smear cancellation circuit, multiplying the average value by a factor to obtain an offset value, and subtracting the offset value from the digital codes to obtain smear-cancelled digital codes.

These and other benefits and advantages of the present invention will be apparent to those of skill in the art after reading the following detailed description of the embodiments.

BRIEF DESCRIPTION OF THE DRAWINGS

The drawings are not necessarily to scale, emphasis is placed on illustrating the principles of the inventive concepts. For example, the dimensions of some of the elements are exaggerated relative to each other for clarity. The accompanying drawings, where like reference numerals indicate like elements, illustrate embodiments of the present disclosure.

DETAILED DESCRIPTION OF THE INVENTION

Conventional CMOS image sensors utilize shared control lines to read out pixel signals of pixels arranged in a same row. The simultaneous readout of pixel signals of a large number of pixels may induce noise and offset in the shared control lines, especially when the large number of pixels are bright pixels.

Figure 1:
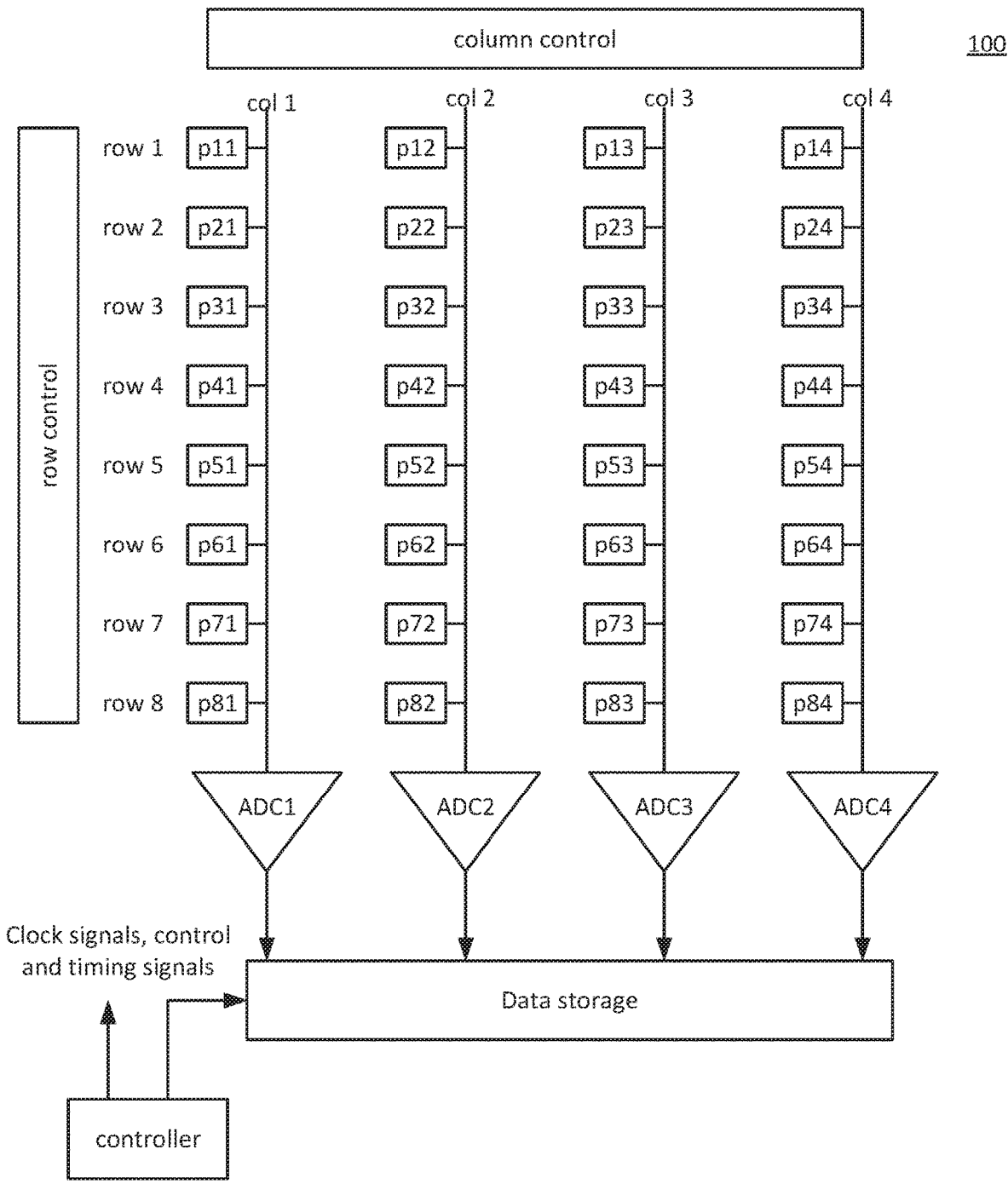
FIG. 1 is a simplified schematic diagram of an image sensor where pixel signals of pixels are readout row-wise to respective analog-to-digital converters.

FIG. 1 is a simplified schematic diagram of an image sensor 100 where pixel signals of pixels are readout row-wise to respective analog-to-digital converters. Referring to FIG. 1, image sensor 100 includes a pixel array having eight rows (row 1 to row 8) and four columns (col 1 to col 4) of pixel sensors (alternatively referred to as pixels) (p11-p14 to p81-p84), each of the pixels in a same column is provided to a respective analog-to-digital converter (ADC) for digital signal conversion under control of a row control circuit and a column control circuit. The row control circuit starts the readout process by selecting a row, e.g., row 1, and the column control circuit provides pixel signals of the pixels in the selected row to the respective ADCs for signal conversion. The readout process will continue successively from a current row to a next row and so forth until pixels in the last row, e.g., row 8, are provided to the respective ADCs.

For example, pixel signals of pixels p11 to p14 are provided to the ADC1 to ADC4 via the column lines col 1 to col 4, respectively. The pixel signals are then converted to digital codes by the ADCs, the digital codes are then stored in a data storage for further processing under control of a controller. The controller also provides timing control signals and clock signals to the image sensor and the ADCs.

Figure 2:
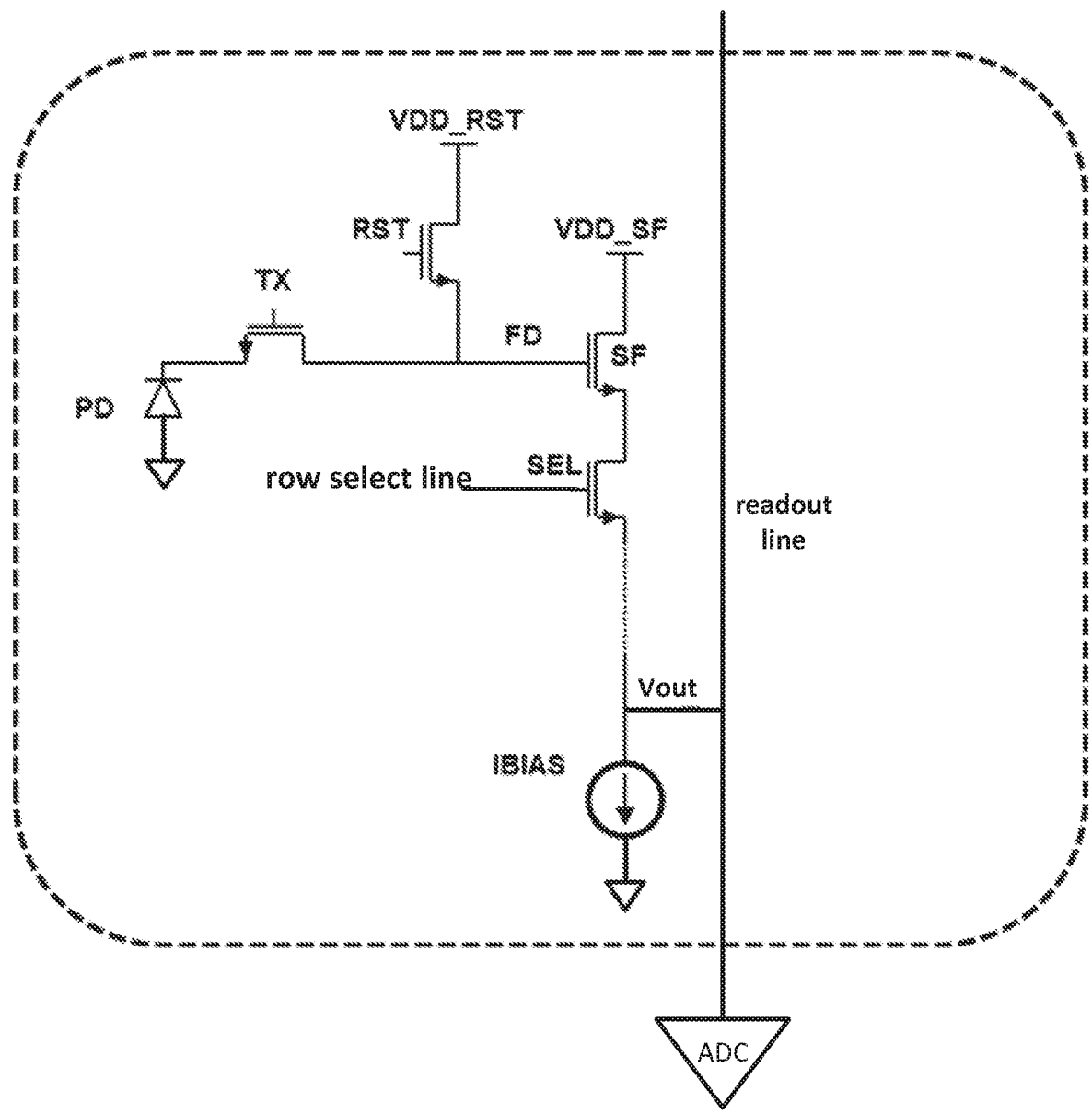
FIG. 2 is a schematic diagram of a portion of an image sensor including a pixel and readout circuit according to an embodiment of the present disclosure.

FIG. 2 is a schematic diagram of a portion of an image sensor including a pixel and readout circuit according to an embodiment of the present disclosure. Referring to FIG. 2, the pixel includes a photodiode (or a photosensitive element) a transfer transistor TX coupled to the photodiode PD, a source follower SF having a gate coupled to the transfer transistor TX, a reset transistor RST coupled to a floating diffusion node FD disposed between the transfer transistor TX and the gate of the source follower SF. The reset transistor RST is configured to charge the floating diffusion node FD to the reset voltage VDD_RST when the reset transistor RST is turned on, thereby resetting the floating diffusion node FD. The photodiode PD may be reset along with the floating diffusion node FD by turning on the transfer transistor TX. The source follower SF has a terminal coupled to the source follower voltage VDD_SF and another terminal coupled to a select transistor SEL. The select transistor SEL has a gate coupled to a row select line and is disposed between the source follower SF and a voltage readout line that provides an analog output pixel signal VOUT to an analog-to-digital converter ADC. The select transistor SEL is coupled to a current source IBIAS, The analog output pixel signal VOUT is connected to a readout line and provided to an ADC for data conversion. In one embodiment, the transfer transistor TX, the reset transistor RST, the source follower SF, and the select transistor SEL are NMOS transistors.

Figure 3:
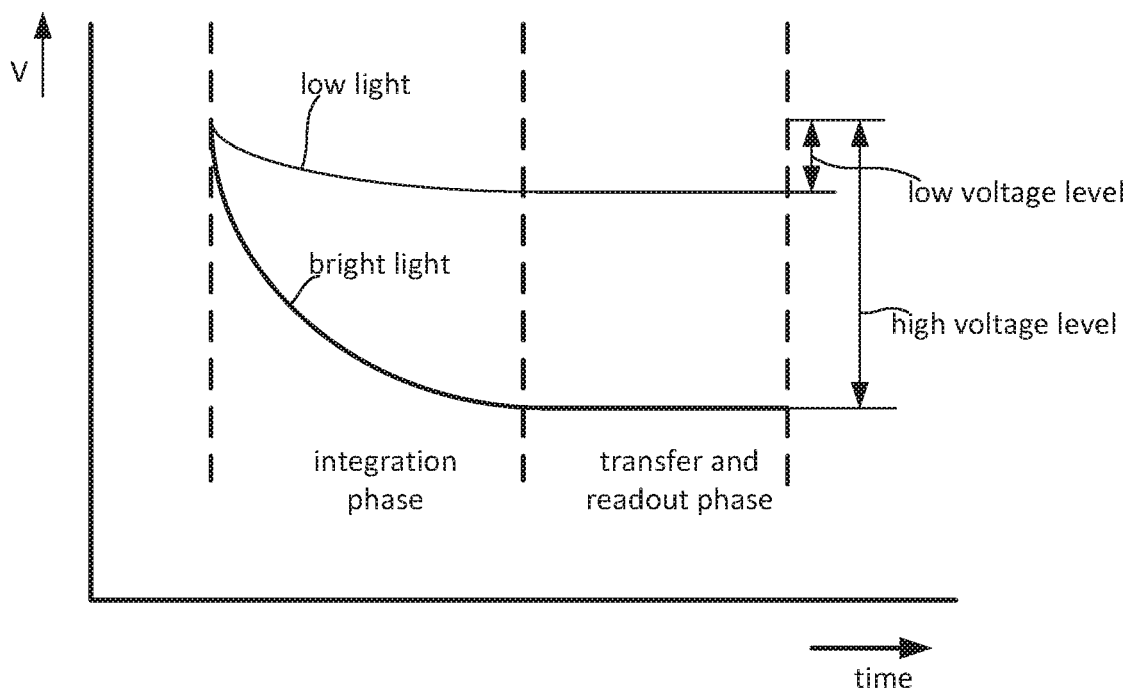
FIG. 3 is a graph diagram illustrating a readout operation of the pixel of FIG. 2 according to an embodiment of the present disclosure.

FIG. 3 is a graph diagram illustrating a readout operation of the pixel of FIG. 2 according to an embodiment of the present disclosure. The pixel readout operation has multiple phases: a reset phase, an integration phase, and an electrin transfer and readout phase. During the reset phase, the photodiode PD is charged to the reset voltage VDD-RST level by the reset transistor RST. During the integration phase, the charge of the photodiode PD decreases at a rate proportional to the amount of received light (photons). The charge of the photodiode PD decreases at a faster rate with bright light and a lower rate with low light. During the electron transfer phase, the electrons that have been accumulated in the photodiode PD are transferred to the FD node. The number of electrons in the photodiode PD is proportional to the number of photon that have arrived at the photodiode PI) during the photodiode exposure time. The voltage level of the gate of the source follower SF will drop as a function of the number of transferred electrons, i.e., received photons or light source intensity. During the readout phase, the row select transistor SEL will be activated so that the gate voltage level of the source follower SF will be provided to the ADC and converted to digital code by the ADC. The simultaneous readout of multiple pixels, in particular those pixels exposed to bright light, can induce switching noise to the power and ground lines, the control line and/or reference line through capacitive coupling between adjacent lines.

Figure 4:
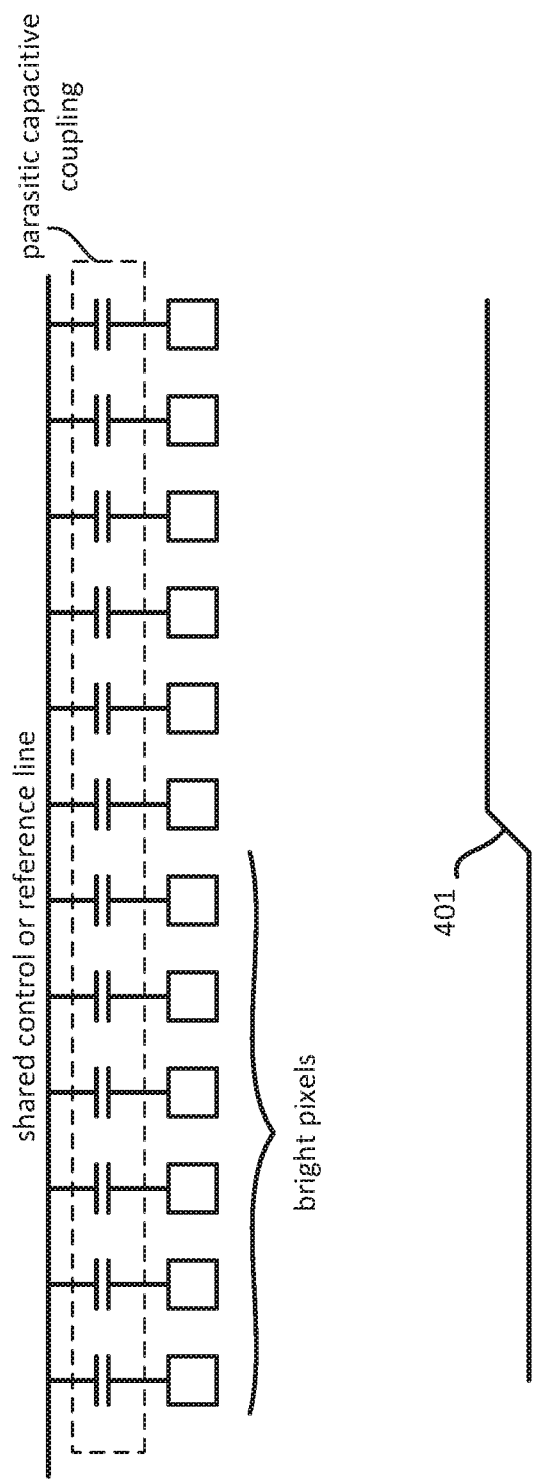
FIG. 4 is a schematic diagram illustrating a smear effect when reading out a number of bright pixels in a row according to an embodiment of the present disclosure.

FIG. 4 is a schematic diagram illustrating a smear effect when reading out a number of bright pixels in a row according to an embodiment of the present disclosure. Referring to FIG. 4, when reading out pixel signals of pixels arranged in a row, the voltage at the floating diffusion node FD, i.e., the voltage level of the gate of the source flowed SF, is transferred to the ADC via the readout line. The voltage transfer on the readout line may cause a voltage drop in the power supply line, a voltage offset at shared control lines (e.g., reset line, row select line, other readout control lines) due to parasitic capacitive coupling. The amount of the voltage level change is a function of light source intensity (i.e., number of photons) impinged upon the exposed pixel. When a number of pixels in a row are exposed to a bright light source, the charge of the exposed pixels will drop. The simultaneous readout of pixels in a row may induce switching noise to the power and ground lines, the shared control lines and shared reference lines through parasitic capacitive coupling. Referring to FIG. 4, a number of pixels sharing a common control or reference line are shown. The common shared control or reference line can be a power supply line, a ground line, a row select line, a readout line, a voltage reference line, and the like. Each of the pixels (shown as square) takes a light sample. The light sample is stored in the pixel in the form of a charge. The charge of each pixel is read out row-wise when activated by a row select line. When a row that is being read out contains a certain number of bright pixels, the simultaneous readout of the pixels may induce noise through parasitic capacitive coupling to the voltage reference line, the power and ground lines and other control lines that can interfere with the pixel signal levels and negatively affect the performance of the ADCs, as indicated by a voltage change 401 in a shared (common) control line, a shared (common) reference line, and/or supply voltage line.

Figure 5:
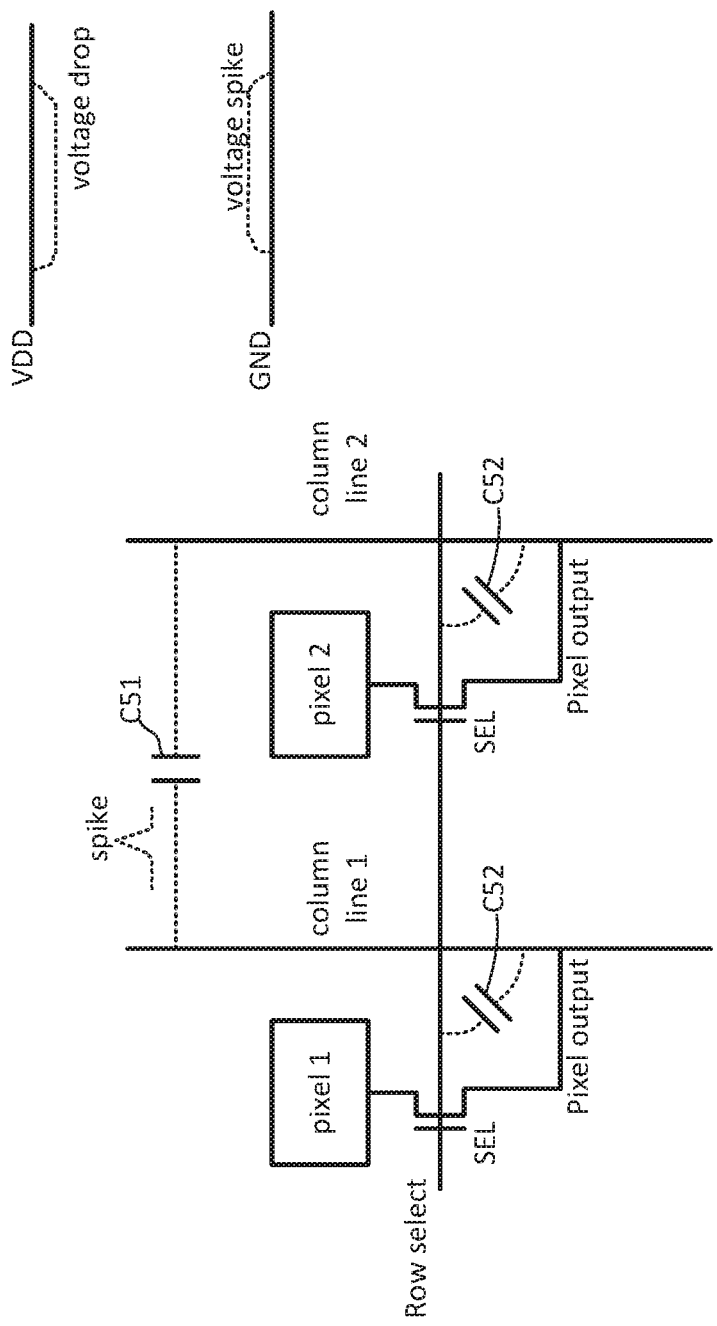
FIG. 5 is a schematic diagram illustrating a capacitive coupling of pixels to a common control line according to an embodiment of the present disclosure.

FIG. 5 is a schematic diagram illustrating parasitic capacitive coupling of pixels to a common control line and to other lines according to an embodiment of the present disclosure. Referring to FIG. 5, two pixels (pixel 1, pixel 2) arranged in a row are shown. These two pixels each provide an analog output signal to a respective column line (column line 1, column line 2) and share a same row select line. As shown, there is a capacitive coupling between the gate and the source of the select transistor SEL and a capacitive coupling (denoted C51) between adjacent column lines. Output signals of the pixels at the column lines may be coupled back to the row select line (capacitive coupling shown as C52). In addition, the simultaneous transfer of the pixel signals to the column lines may cause a voltage drop to the power supply line and/or a line-to-line or line-to-ground spike. The brighter the pixels, the more they pull down the column lines, and the more they cause a voltage drop to the power supply line and spike in the ground line. The larger number of bright pixels, the wider the voltage drop or spike in the power/ground lines. The higher the contrast between adjacent bright pixels and dark pixels that are read out during the same readout interval, the higher the induced noise between the respective adjacent column lines.

Referring still to FIG. 5, the row select line is asserted high, all pixels arranged in that row are activated. When the voltage level of the row select line changes slightly, the voltage level change will affect all the pixel outputs. As described above in connection with FIG. 1, the pixel signals of pixels are provided to a bank of ADCs (ADC1 to ADC4) for data conversion to obtain data codes of the readout pixel signals. The data codes are stored in the data storage. A change in the power supply line and/or ground line will also affect the performance of the ADCs.

The magnitude of smear effect will vary in different image sensor implementations and may even vary in polarity. However, many of the coupling paths will be systematic and highly linear (metal to metal coupling capacitance, for example). Thus, the information on the impairment from smear is indirectly encoded in the digital pixel readout. For any given image sensor read out of many simultaneously read out pixels there is a factor, alpha, such that the average digital code read out error due to smear is equal to alpha multiplied by the average digital code read out.

One inventive concept is to derive the factor alpha, either from understanding of the circuit elements or characterization of the image sensor, and use to apply a correction to read out from the pixel array. Nominally, the same factor alpha will apply to all pixels which are read out simultaneously or concurrently. The correction factor would simply be to subtract from every pixel the average digital code readout multiplied by the factor alpha.

Based on the pixel array implementation and the readout process the coupling of all pixels read out simultaneously may not couple to each other in an identical way. There may be multiple sets of pixels which each share a common signal, but which is not common across the entire pixel array and the coupling of shared signals back to pixel read outs may vary with pixel signals due to nonlinearities in the coupling, or critical readout moments being a function of pixel signal itself. A general solution compromising a manageable number of different cancellation factors related to the array structure and likely smear coupling pathways is proposed to optimize the degree to which this technique can be used to completely cancel smear. Thus, a subset of pixels could cancel smear between just that set of pixels using a cancellation factor of alpha, while the smear effect common to all pixels in a row, which are read out at the same time, use an additional cancellation factor of beta.

Consider a 48 megapixel array with 6000 rows and 8000 columns. In this example, there are 4000 ADCs to read out 4000 pixels from a single row at one instance. Let assume in each pixel a select transistor is used to drive the output from that pixel onto a shared output column line. Suppose the control signal controlling this select transistor is shared among the entire pixel row. Suppose that the coupling from each individual output line to the shared select line is $5*10^{-6}$. Suppose that the coupling from the shared select line to the output line is 0.1. Consider the case where 2000 pixels are illuminated by a bright light source, and the pixel output voltage swing for these illuminated pixels is 800 mV. In this case, the change on the select line will be 800 mV$*5*10^{-6}*2000$ or 8 mV. The effect on each of the other 2000 pixels will be 8 mV$*0.1$ or 800 μV. Suppose that the smallest signal of interest in accurately detecting is 200 μV. The smear effect is quite large compared to this level. If the digital output code is utilized to anticipate and remove this smear effect to an accuracy of 10%, the residual smear effect in this example can be reduced to 80 μV, below the smallest signal of interest to be accurately detected, In a large array image sensor, the digital readout circuit must perform several adjustment and scaling operations on each pixel individually, including typically some kind of offset removal. In accordance with some embodiments of the inventive concepts of the present disclosure, an apparatus and method are provided which include steps of adding an algorithm to sum all digital data (digital codes) of the readout pixels, obtaining an average value of the digital data, and multiplying the average value by a single factor to obtain a digital code readout error to eliminate smear due to voltage change in shared control and reference line. Determining a new adjustment factor to the offset removal step will be a fairly low cost addition to the set of digital computations required.

Figure 6:
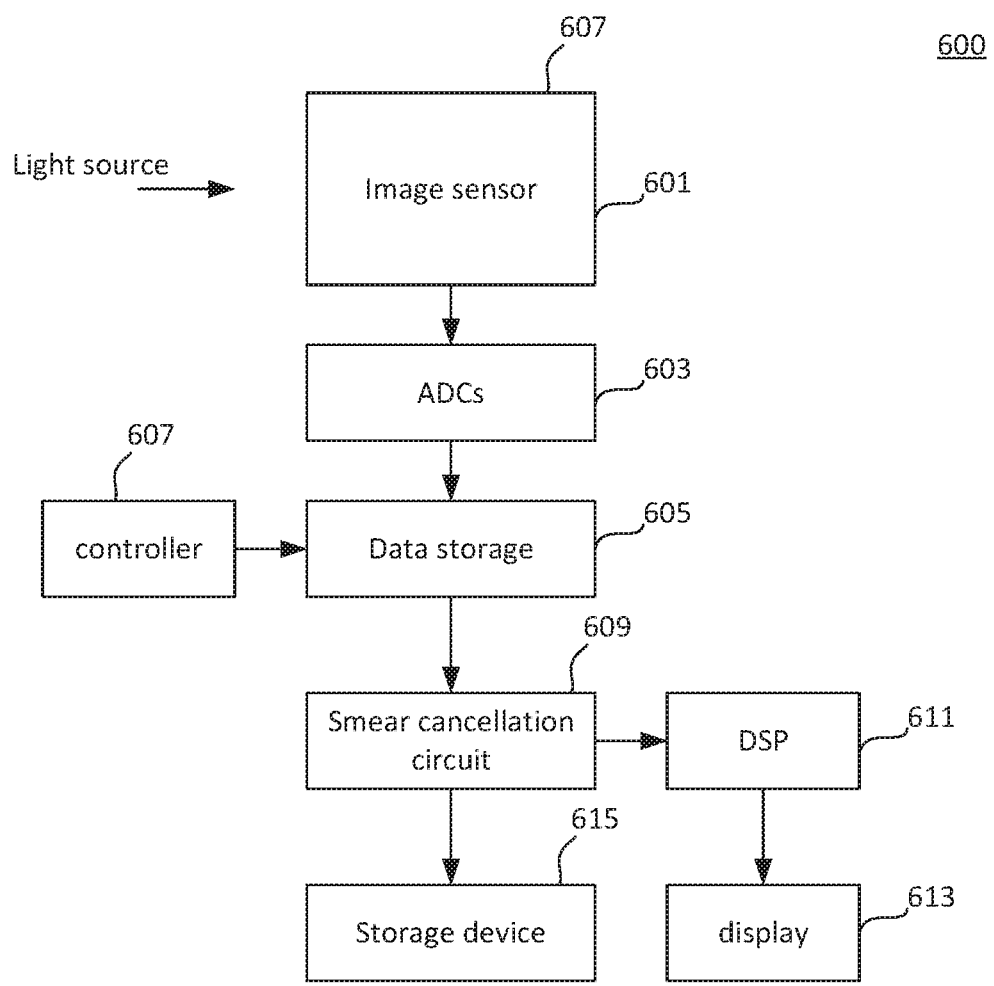
FIG. 6 is a schematic diagram illustrating an apparatus for reducing or eliminating smear in an image sensor according to an embodiment of the present disclosure.

Embodiments of the present disclosure provide an apparatus and method for eliminating smear in an image sensor. FIG. 6 is a schematic diagram illustrating an apparatus 600 for reducing or eliminating smear in an image sensor according to an embodiment of the present disclosure. Referring to FIG. 6, apparatus 600 includes an image sensor 601 containing a plurality of pixels arranged in rows and columns and a bank of analog-to-digital converters (ADCs) 603 configured to convert pixel signals of readout pixels to respective digital codes. Image sensor 601 is exposed to a light source, where each of the pixels takes a light sample. The light sample is stored in the pixel in the form of a charge. The charge of the pixels are readout row-wise when a row select signal of that row is activated. After pixels in a row are read out, a next row select signal is applied to a next row to read out pixels of that row. Apparatus 600 also includes a data storage 605 coupled to the ADCs and configured to store the digital codes, and a controller 607 configured to provide reference clocks and control and timing signals to apparatus 600. In an example embodiment, image sensor 601, ADCs 603, data storage 605, and controller 607 may have a structure and operations similarly to the image sensor structure of FIG. 1. In another embodiment, the number of pixels arranged in a row is greater than the number of ADCs, so that the ADCs perform repeatedly several times to complete the data conversion of the pixels in a row.

Apparatus 600 further includes a smear cancellation circuit 609 coupled to data storage 605 and configured to compute a digital average value of the digital codes and scale the digital average value by a factor to obtain an offset value. The offset value represents a smear amount of the readout pixel signals. The offset value (the smear amount) is a function of the digital average value and the factor, i.e., the digital average value is large with bright pixels and small with dark pixels. In one embodiment, the factor can be generated by computer simulation. For example, a computer simulation can be performed using a design model of the image sensor. In another embodiment, the factor can be generated by a device characterization. For example, the device characterization can be performed based on experiments and measurements, e.g., the image sensor is submitted to different exposure conditions, and a smear amount is measured to derive the factor. In one embodiment, smear cancellation circuit 609 is further configured to subtract the offset value from the digital codes to cancel smear. As described with reference to FIGS. 4 and 5, smear is caused by simultaneous reading out pixels in a row or a part of a row that contains a certain number of bright pixels. The smear effect is linear. The smear effect or characteristics are associated with a given image sensor design. The factor is associated with an offset in a reference line, a power/ground line and/or a control line when reading out pixels in a row. When pixels in a row are dark pixels, their readout has a small smear effect, which may not be visually critical. However, a presence of a certain number of bright pixels in a row, when pixels of that row are read out at a same time interval, will have a significant effect on each other because their signal levels are coupled to all kinds of shared lines in the analog readout process. In one embodiment, this effect is utilized to calculate the offset value of the digital codes by determining a factor, and the offset value can be determined by multiplying the digital average value of the digital codes by the factor. The factor can be derived from computer simulation or device characterization.

In one embodiment, the factor may be determined by experimental tests or characterizations of test chips. In another embodiment, the factor may be determined by computer simulation. For example, a number of tests or characterizations may be performed by first measuring an image sensor that is exposed to a predetermined object profile, a set of digital codes is then obtained and stored in the data storage. The predetermined object profile can be, for example, a scenery picture (sunrise, sunset), an incoming vehicle with head-tights turned on, etc. The smear cancellation circuit then calculates a digital average value and multiples the digital average value by the factor to obtain an offset value. The smear cancellation circuit further subtracts the offset value from the set of digital codes to obtain a set of smear-reduced or smear-canceled digital codes.

In one embodiment, the inventive concept of the present disclosure may include determining a plurality of factors associated with the pixel array structures to optimally cancel smear. For example, a first factor is determined and utilized to cancel smear in a subset of pixels arranged in a row, which are read out at the same time, and a second factor is determined and utilized to cancel smear in all pixels arranged in an entire row, which are read out at the same time. In one embodiment, smear cancellation circuit 609 may determine whether a number of stored digital codes exceed a predetermined threshold value. When smear cancellation circuit 609 determines there is a critical number of bright pixels being concurrently readout in a row, the smear cancellation circuit will correct the digital codes using a first correction factor. When the number of the stored digital codes is smaller than or equal to the predetermined threshold value, the smear cancellation circuit will correct the digital codes using a second correction factor. In one embodiment, when the number of the stored digital codes is smaller than a second predetermined threshold value, e.g., the number of bright pixels is sufficiently small that the bright pixels will not cause smear that is visually critical, the smear cancellation circuit will not correct the digital codes.

In one embodiment, smear cancellation circuit 609 may include circuitry that perform functions or operations of calculating the digital average value of the set of digital codes, multiplying the digital average value by a factor to obtain an offset value, and subtracting the offset value from the set of the digital codes to obtain a set of smear-canceled digital codes. The functions or operations may include logic functions or logic operations (e.g., Boolean logic, arithmetic logic, combination logic, etc.). In one embodiment, smear cancellation circuit 609 may include a processing unit including a memory including instructions for performing the functions or operations described above.

In one embodiment, apparatus 600 further includes a digital signal processing (DSP) unit 611 that processes the smear-canceled digital codes received from smear cancellation circuit 609, and passes on the processed data codes to a display device 613 for displaying. In one embodiment, apparatus 600 further includes a storage device 615 coupled to smear cancellation circuit 609 and configured to store the smear-canceled digital codes for further processing. In one embodiment, storage device 615 may be a part of data storage 605.

Figure 7:
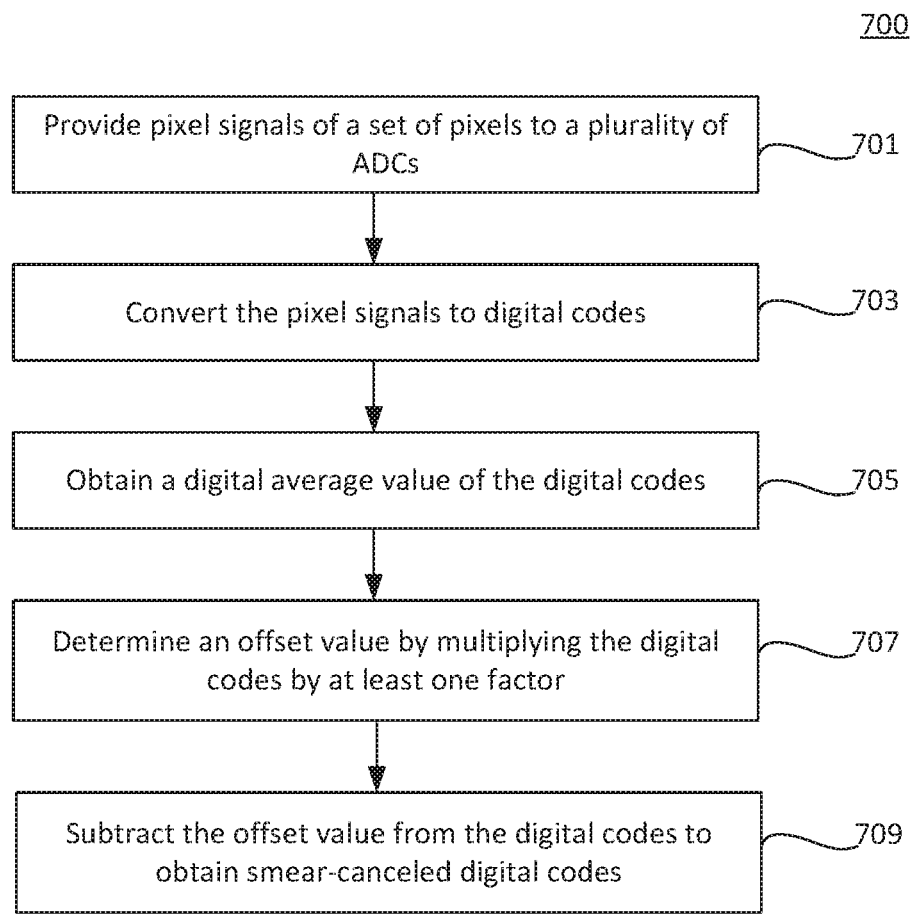
FIG. 7 is a simplified flow chart illustrating a method of eliminating or reducing smear in an image sensor according to an embodiment of the present disclosure.

Embodiments of the present disclosure also provide a method of eliminating or reducing smear in an image sensor. FIG. 7 is a simplified flow chart illustrating a method 700 of eliminating or reducing smear in an image sensor according to an embodiment of the present disclosure. Referring to FIG. 7, method 700 starts at block 701 where pixel signals of a set of pixels are provided to a plurality of analog-to-digital converters (ADCs) for data conversion. The set of pixels may be disposed in a same row. In one embodiment, pixel signals of the entire set of pixels may be concurrently read out to the ADCs. In one embodiment, only pixel signals of a subset of the set of pixels are concurrently read out to the ADCs. At block 703, the pixel signals are converted by the respective ADCs to digital codes representative of the pixel signals, and the digital codes are stored in a data storage. Method 700 continues to block 705, where a digital average value is obtained by calculating an average of the digital codes. At block 707, an offset value is obtained by multiplying the digital average value by at least one factor. The at least one factor can be predetermined based on a result of measurements and characterization of the pixel array structure. Alternatively, the at lest one factor may be determined based on a computer simulation result of the image sensor. At block 709, method 700 also includes subtracting the offset value from the digital codes to obtain smear-canceled digital codes.

According to some embodiments of the present disclosure, the at least one factor may include a suitable number of factors based on the pixel array structure and the pixels readout process. For example, the amount of smear may depend on the coupling level between pixel readout lines, the layout design of the pixel array, e.g., the pixel array may have multiple sets of pixels which each share a common signal, but which is not common across the entire pixel array, and the coupling of shared signals back to pixel readouts can vary with pixel signals due to nonlinearities of the coupling. The method thus includes determining a suitable number of factors. The number of factors can be based on the design layout of the image sensor (e.g., adjacent pixels in the set of pixels, capacitive coupling of adjacent lines, such as columns lines, row select lines, power or ground line, reset line and the like), the number of bright pixels in the set of pixels that are concurrently read out. In one embodiment, the method may include determining whether a subset of pixels in the set of pixels are concurrently read out to the ADCs. When the subset of pixels contains a number of bright pixels having digital codes greater than a predetermined threshold value, the method may select a first factor as the at least one factor for obtaining the offset value. When the subset of pixels contains a number of pixels having digital codes smaller than or equal to the predetermined threshold value, a second factor may be selector as the at least one factor for obtaining the offset value. When the entire set of pixels are determined to be concurrently read out to the ADCs, the method may select a third factor as the at least one factor for obtaining the offset value. Of course, one skilled in the art will appreciate that many variations of the pixel readout process and pixel arrays of an image sensor are possible within the confines of the present invention.

The above description of illustrated embodiments is not intended to be exhaustive. While the inventive concepts are described herein for illustrative purpose, various modifications are possible within the scope of the invention.

What is claimed is:

1. An apparatus of reading out an image sensor including a plurality of pixels arranged in rows and columns, the apparatus comprising:

a plurality of analog-to-digital converters (ADCs) coupled to respective columns and configured to output digital codes representative of received pixel signals of a set of pixels coupled to the respective columns; and a smear cancellation circuit configured to:

determine an average value of the digital codes;

multiply the average value by at least one factor to obtain an offset value; and subtract the offset value from the digital codes to obtain smear-cancelled digital codes.

2. The apparatus of claim 1, wherein the at least one factor is a predetermined value of a computer simulation result of the image sensor.

3. The apparatus of claim 1, wherein the at least one factor is a characterization result of the image sensor.

4. The apparatus of claim 1, wherein the at least one factor comprises:

a first factor associated with a subset of the set of pixels disposed in a same row, the subset of the set of pixels being concurrently read out to the ADCs; and the smear cancellation circuit is configured to multiply the average value by the first factor to obtain the offset value.

5. The apparatus of claim 1, wherein the at least one factor comprises:

a second factor associated with the set of pixels disposed in a same row, the set of pixels being concurrently read out to the ADCs; and the smear cancellation circuit is configured to multiply the average value by the second factor to obtain the offset value.

6. The apparatus of claim 1, wherein the at least one factor comprises a plurality of factors, and the smear cancellation circuit is further configured to:

determine a number of the digital codes having a value greater than a predetermined threshold value to obtain a determination result;

select a factor of the plurality of factors in response to the determination result; and multiply the average value by the selected factor to obtain the offset value.

7. The apparatus of claim 6, wherein the number of the digital codes are associated with a number of bright pixels of the set of pixels.

8. The apparatus of claim 1, wherein the at least one factor is a function of a capacitive coupling between adjacent lines of the set of pixels or adjacent pixels of the set of pixels disposed in a same row.

9. The apparatus of claim 8, wherein the adjacent lines are one of a column line, a row select line, a power line, a ground line, and a reset line.

10. The apparatus of claim 1, further comprising a data storage configured to store the digital codes.

11. An image sensor comprising the apparatus of claim 1.

12. A method of cancelling smears in an image sensor comprising a pixel array having a plurality of pixels arranged in rows and columns, the method comprising:

providing pixel signals of a set of pixels to a plurality of analog-to-digital converters (ADCs);

converting the pixel signals to digital codes representative of the pixel signals by the ADCs;

determining an average value of the digital codes by a smear cancellation circuit;

multiplying the average value by at least one factor to obtain an offset value; and subtracting the offset value from the digital codes to obtain smear-cancelled digital codes.

13. The method of claim 12, prior to determining the average value, further comprising:

storing the digital codes in a data storage.

14. The method of claim 12, wherein the at least one factor comprises a plurality of factors, the method further comprising:

determining a number of the digital codes having a value greater than a predetermined threshold value to obtain a determination result;

selecting a factor of the plurality of factors in response to the determination results; and multiplying the average value by the selected factor to obtain the offset value.

15. The method of claim 14, wherein the number of the digital codes are associated with a number of bright pixels of the set of pixels.

16. The method of claim 12, further comprising storing the smear-cancelled digital codes in a storage device for further processing.

17. The method of claim 12, wherein the at least one factor comprises a first factor associated with a subset of pixels in the set of pixels and a second factor associated with the entire set of pixels, the method further comprising:

determining whether the subset of pixels are concurrently read out to the ADCs;

when the subset of pixels are determined to be concurrently readout to the ADCs:

selecting the first factor to be the at least one factor to obtain the offset value;

when the entire set of pixels are determined to be concurrently readout to the ADCs:

selecting the second factor to be the at least one factor to obtain the offset value.

18. The method of claim 12, wherein the at least one factor is a predetermined value of a computer simulation result of the image sensor.

19. The method of claim 12, wherein the at least one factor is a characterization result of the image sensor.

20. The method of claim 12, wherein the at least one factor is a function of a capacitive coupling between adjacent lines of the set of pixels or adjacent pixels of the set of pixels disposed in a same row.

* * * * *